(12) United States Patent
Bellassai et al.

(10) Patent No.: US 6,833,534 B2
(45) Date of Patent: Dec. 21, 2004

(54) METHOD AND STEAMING OVEN AND COLLECTOR PLATE

(75) Inventors: Joseph S. Bellassai, Mentor, OH (US); John E. Richnafsky, Jefferson, OH (US); Jason D. Schreiner, Cleveland Heights, OH (US)

(73) Assignee: Cleveland Range, Cleveland, OH (US)

( * ) Notice: Subject to any disclaimer, the term of this patent is extended or adjusted under 35 U.S.C. 154(b) by 0 days.

(21) Appl. No.: 10/420,548

(22) Filed: Apr. 22, 2003

(65) Prior Publication Data
US 2003/0213792 A1 Nov. 20, 2003

Related U.S. Application Data
(60) Provisional application No. 60/374,993, filed on Apr. 23, 2002.

(51) Int. Cl.⁷ .................................................. A21B 1/00
(52) U.S. Cl. ............................ 219/401; 126/20; 99/467
(58) Field of Search ................................ 219/400, 401, 219/385, 386, 521; 126/20, 21 A, 369, 369.1, 369.2, 20.1; 99/330, 331, 339, 340, 400, 401, 444, 446, 467, 468, 469, 473, 474, 476, 480, 483, 516, 536

(56) References Cited

U.S. PATENT DOCUMENTS

| | | | |
|---|---|---|---|
| 527,252 A | 10/1894 | Stroud | |
| 677,035 A | 6/1901 | Laird | |
| 931,088 A | * 8/1909 | Roberts | 219/401 |
| 1,051,503 A | 1/1913 | Klein | |
| 1,714,311 A | * 5/1929 | Keiper | 126/369 |
| 2,097,793 A | * 11/1937 | Howell | 99/446 |
| 2,164,226 A | 4/1939 | Bayer | 126/273 |
| 2,766,366 A | * 10/1956 | Eckhoff | 219/401 |
| 4,506,598 A | 3/1985 | Meister | 99/330 |
| 4,648,382 A | * 3/1987 | Greenbacker | 219/401 |
| 4,773,319 A | 9/1988 | Holland | 99/446 |
| 5,313,877 A | 5/1994 | Holland | 99/446 |
| 5,318,792 A | 6/1994 | Tippmann | 426/510 |
| 5,411,753 A | 5/1995 | Tippmann | 426/510 |
| 5,515,773 A | 5/1996 | Bullard | 99/330 |
| 5,662,959 A | 9/1997 | Tippmann | 426/641 |
| 5,767,487 A | 6/1998 | Tippmann | 219/440 |
| 5,869,812 A | * 2/1999 | Creamer et al. | 219/401 |
| 5,993,878 A | 11/1999 | Tippmann | 426/510 |
| 6,125,738 A | * 10/2000 | Poister | 219/401 |
| 6,152,024 A | 11/2000 | Tippmann | 99/472 |
| 6,213,002 B1 | 4/2001 | Batten et al. | 99/340 |
| 6,267,046 B1 | 7/2001 | Wa nat | 99/332 |

OTHER PUBLICATIONS

International Search Report Application No. PCT/US03/12319 dated Feb. 12, 2004.

* cited by examiner

*Primary Examiner*—Teresa J. Walberg
(74) *Attorney, Agent, or Firm*—Ohlandt, Greeley, Ruggiero & Perle, L.L.P.

(57) ABSTRACT

A steaming oven having a collector plate disposed in an oven chamber. A collector plate is disposed above a boiling water reservoir in the oven chamber. The collector plate has drain tube inserted into an overfill tube disposed in the reservoir. Waste material from the steam and food droppings is conveyed from the oven chamber via the drain tube and the overfill tube.

29 Claims, 4 Drawing Sheets

METHOD AND STEAMING OVEN AND COLLECTOR PLATE

This application claims the benefit of U.S. Provisional Application Ser. No. 60/374,993, filed on Apr. 23, 2002, the entire contents of which are incorporated herein by reference.

FIELD OF THE INVENTION

This invention relates to a method and a steaming oven having a collector plate that collects and disposes of waste material from cooking food products with steam.

BACKGROUND OF THE INVENTION

Sub-atmospheric cook-and-hold steaming ovens are known. For example, U.S. Pat. No. 5,235,903 discloses an open topped water holding tray that is disposed at the bottom of the oven. The oven includes means to heat the water to provide steam for cooking and/or holding food products warm and moist. A manually operated drain valve is provided near the lowermost portion of the water tray. An optional grease catching pan is disposed between the racks of the oven and the water tray. The drain valve is manually operated to periodically drain the water tray.

The grease catching pan catches droppings (e.g., condensed steam entrained with food protein, food scraps and other undesirable materials) that drip from food being cooked in the oven. This prevents the droppings from one food batch entering the water tray, which could cause foam to develop in the steaming compartment. The foam could then spill from the cooking compartment when the door is opened, thereby causing slipping hazards and other undesirable effects. Although the grease catching pan catches the droppings, an operator needs to keep a close watch to empty the pan before it fills and overflows into the water tray.

Drip pans with a drain tube are also known. For example, U.S. Pat. No. 4,773,319 discloses a drip pan that is sloped to guide droppings to a channel leading to a drain tube that exits the cooking chamber. This arrangement is disposed between the grill or grate and the flames of a burner so as to minimize flaming due to grease droppings.

It is also known to provide a water tray with an overflow control. For example, U.S. Pat. No. 2,097,793 discloses a water tray that serves the dual function of providing steam to the cooking chamber and the collection of waste droppings. A funnel is disposed in the tray to direct the waste droppings and water to a catch pan as the water/grease level exceeds the height of the funnel. The dual function water tray has the disadvantage that waste contaminants enter the boiling water tray, which in turn contaminates food cooked in later batches with the tastes or residues of previously cooked items.

There is a need for an improved steaming oven and droppings removal system.

SUMMARY OF THE INVENTION

A steaming oven of the present invention comprises an oven chamber and a water reservoir disposed in the oven chamber to provide steam therein. An overflow tube is disposed in the water reservoir so as to prevent water from exceeding a predetermined level. A collector plate is disposed in the oven chamber above the water reservoir. The collector plate comprises a drain in registry with the overflow tube so that waste material collected by the collector plate flows through the overflow tube.

In one embodiment of the steaming oven of the present invention, the drain comprises a drain tube that is inserted into the overfill tube. The drain tube has a smaller diameter than a diameter of the overfill tube. A drain cover optionally is in registry with the drain.

In another embodiment of the steaming oven of the present invention, the collector plate comprises a front support and a back support that are dimensioned and positioned to align the collector plate and the drain with the overfill tube when the collector plate is being installed in the oven chamber. Preferably, the overfill tube provides additional support for the collector plate. The front support may optionally have a water fill opening. Preferably, the back support comprises a tubular shape.

In still another embodiment of the steaming oven of the present invention, the collector plate is removably disposed in the oven chamber.

In yet another embodiment of the steaming oven of the present invention, the collector plate is dimensioned so that a gap is provided along at least three edges thereof for the passage of steam from the reservoir into the oven chamber.

In any of the above mentioned embodiments, the collector plate is sloped toward the drain.

A method of the present invention disposes of waste material in a steaming oven chamber by collecting the waste material in a collector plate disposed above a reservoir of water in the oven chamber. The waste material is conveyed from the oven chamber via a drain of the collector plate and an overfill tube disposed in the reservoir.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

As used herein, steaming oven is intended to include any cooking oven that uses steam in whole or in part to cook. For example, the oven may use steam only or steam in combination with convection, conduction or other thermal transfer. Thus, the steaming oven of the present invention includes, for example, steam ovens as well as convection ovens, microwave ovens or combinations thereof that also employ steam.

Figure 1:
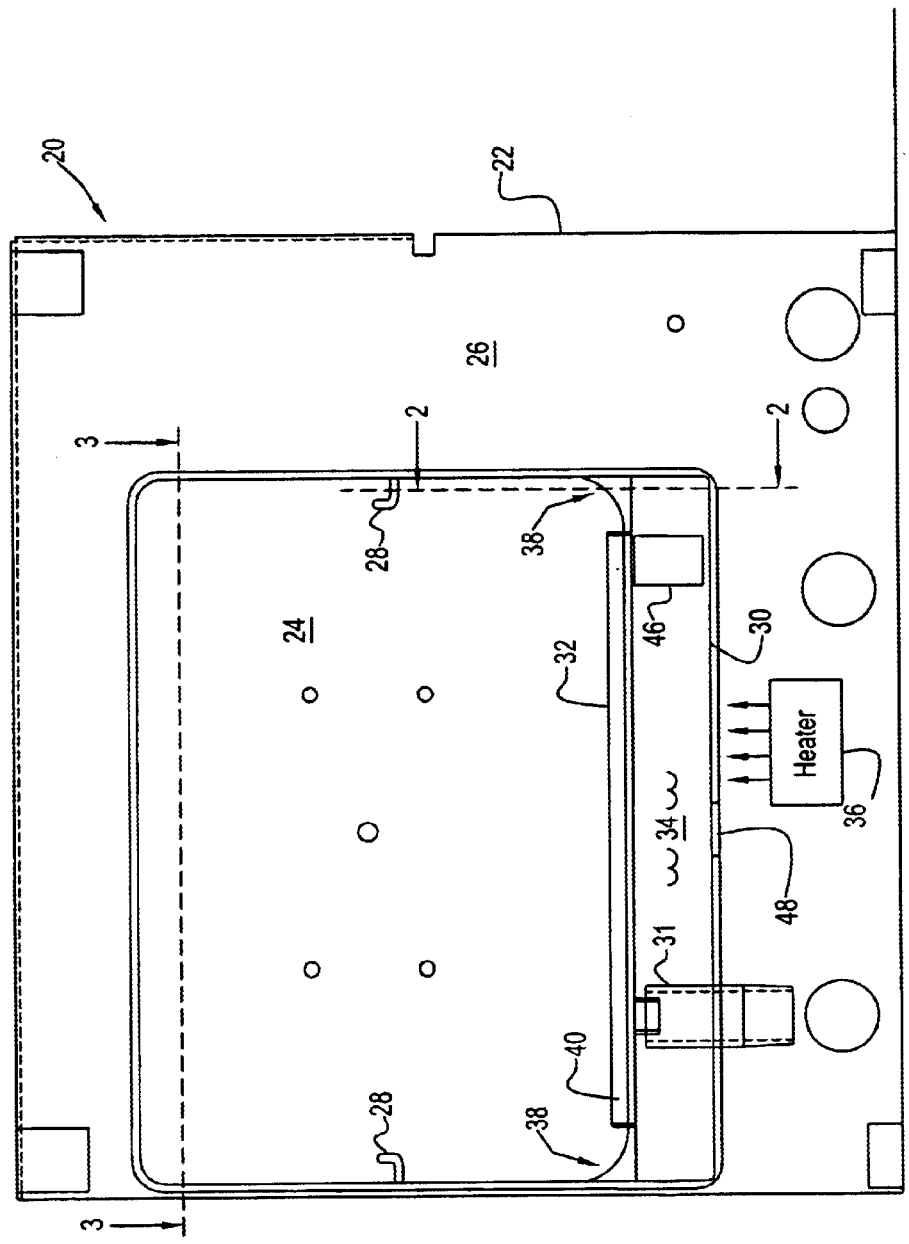
FIG. 1 is a front view of a steaming oven of the present invention with the front door removed.
Figure 2:
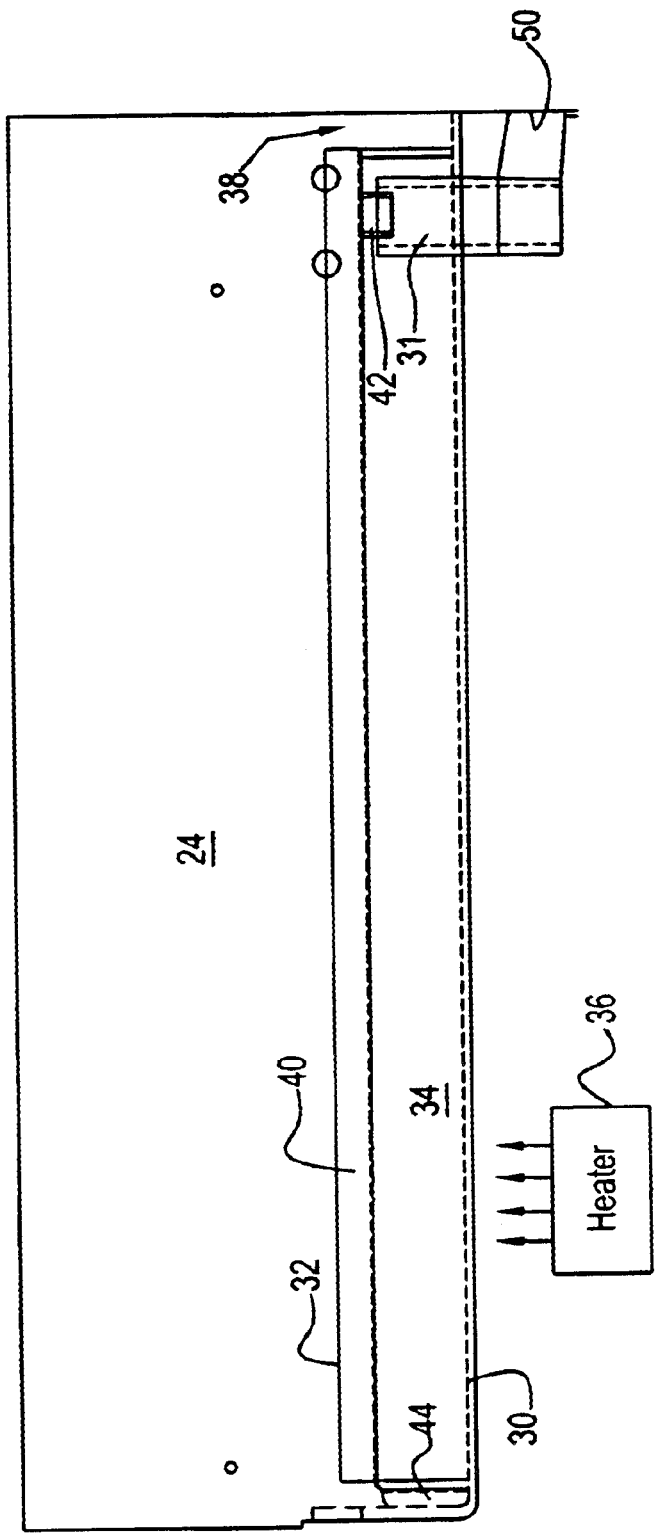
FIG. 2 is a view along the line 2 of FIG. 1.
Figure 3:
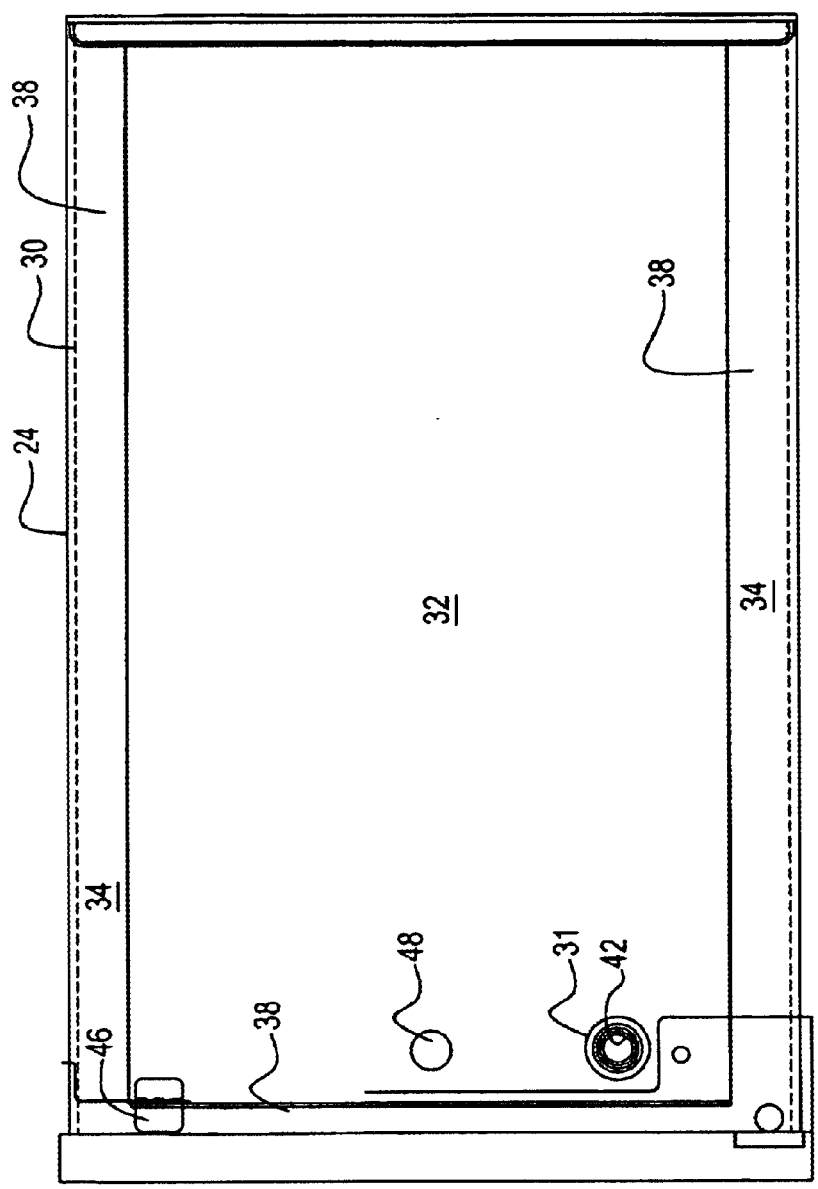
FIG. 3 is a view along the line 3 of FIG. 1.

Referring to FIGS. 1–3, a steaming oven 20 of the present invention includes a housing 22 that supports a cooking chamber 24 and a region 26 for such items as controls, a blower fan, and/or a microwave energy source (none of which is shown). Oven chamber 24 includes a rack holder 28, a reservoir 30, and a collector plate 32. Rack holder 28 holds a rack (not shown) upon which food may be located for cooking. It will be apparent to those skilled in the art that rack holder 28 may include additional holders to hold more than one rack.

Reservoir 30 is formed by the bottom and four sides of oven chamber 24 to hold water 34. It will be apparent to those skilled in the art that reservoir 30 may be a separate tray or other vessel. An overfill tube 31 is disposed in reservoir 30 to prevent water 34 from exceeding a predetermined level therein.

Reservoir 30 comprises a water fill valve (not shown) and a drain 48. The water fill valve may be manually operated or automatically operated in response to a water level sensor (not shown) that senses water level in reservoir 30. Drain 48 may be interconnected with tubing and a drain valve (neither being shown) to drain water 34 from reservoir 30. Overfill tube 31 is connected via an oven exit hole 50 to drain water 34 and waste material to an external drain or vessel.

A heater 36 is disposed in region 26 in a location to heat reservoir 30 so as to boil water 34, thereby producing steam. For example, heater 36 may be disposed below reservoir 30. Heater 36 may be an electrical heater, a gas burner or other heater suitable for heating reservoir 30 to boil water 34.

Collector plate 32 is disposed in oven chamber 24 above reservoir 30 so as to prevent waste material from falling into reservoir 30 and contaminating water 34. Thus, collector plate 32 is large enough to catch waste material produced by cooking and small enough to allow steam from reservoir 30 to rise in oven chamber 24 for cooking. To this end, collector plate 32 is shorter in width and length than reservoir 30 to form a passage 38 as a border between collector plate 32 and the perimeter of reservoir 30 to allow steam to rise and fill oven chamber 24. Passage 38 is formed on the sides and back of oven chamber 24, but could just as well also be formed on the front thereof. It will be apparent to those skilled in the art that passage 38 can be along more or less than three sides of collector plate 32 or could even be formed by perforations in a border of collector plate 32.

The waste material, for example, includes solid and liquid droppings from the food being cooked as well as condensed steam droplets. The droppings may be directly from the food or from solid or perforated pans holding the food.

Figure 4:
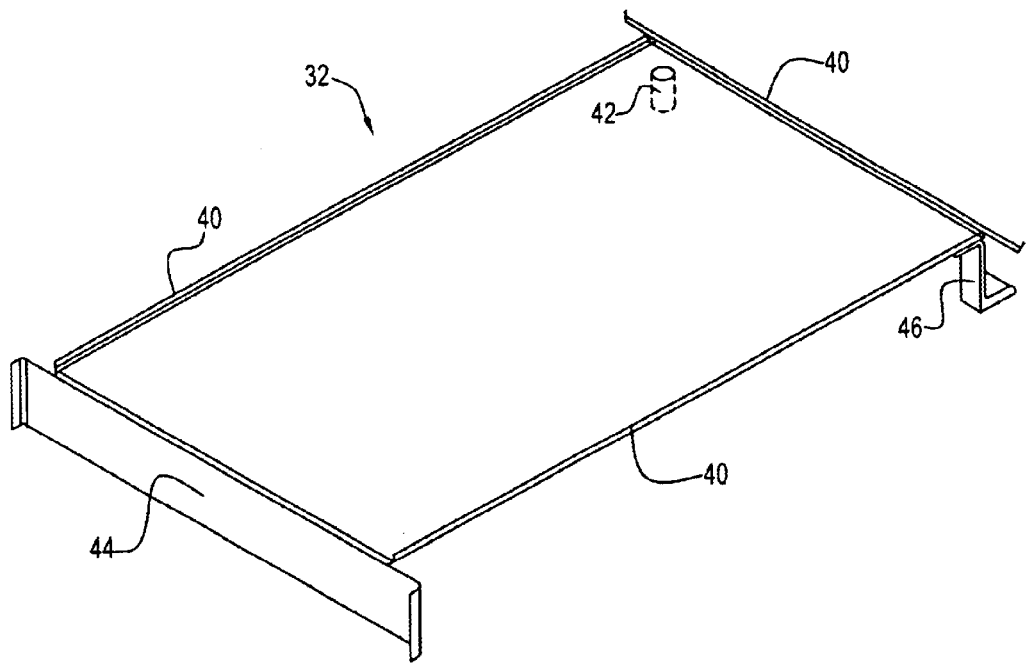
FIG. 4 is a perspective view of the collector plate of the oven of FIG. 1.

Referring also to FIG. 4, collector plate 32 has a retaining lip 40 on its side and rear edges and a drain tube 42. Lip 40 retains and directs the waste material fluid to drain tube 42. The back corners of collector plate 32 are sealed to prevent leakage of the waste material fluid.

Collector plate 32 has a support 44 along a front edge thereof and a support 46 at the back corner that is remote from the location of drain tube 42. Supports 44 and 46 act to position collector plate 32 within oven chamber 24 so that drain tube 42 is in registry with overfill tube 31 of reservoir 30 (best seen in FIGS. 1 and 2). Drain tube 42 has a smaller diameter than that of overfill tube 31 so that drain tube 42 extends removably into overfill tube 31. Overfill tube 31, front support 44 and back corner support 46 are dimensioned so that when installed in oven chamber 24, collector plate 32 slopes downwardly toward drain tube 42 so that the waste material flows by gravity along the surface of collector plate 32 to drain tube 42. For example, front support 44 and back corner support 46 can be higher than overfill tube 42. Alternatively, the sloping can be achieved, for example, by different elevations of the areas within reservoir 30 upon which supports 44 and 46 rest.

Overfill tube 42 is high enough to provide additional support for collector plate 32. Alternatively, an additional back support can be provided at any suitable location, such as, for example, the back corner that is opposite back support 46. Drain tube 42 is designed to fit loosely in overfill tube 31 to facilitate easy installation and removal for cleaning purposes. Preferably, the highest point of collector plate 32 is at the front of oven chamber 24 and below the door opening. This assures that oven chamber 24 cannot be flooded (and injure a person opening the door) in the case of a malfunctioning water fill valve (not shown).

Figure 5:
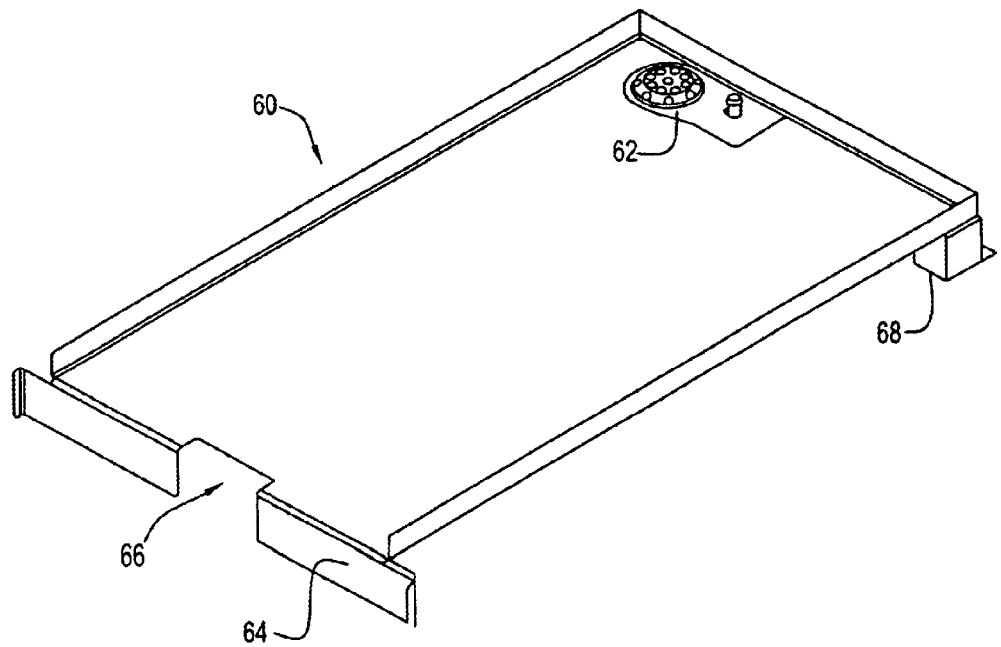
FIG. 5 is a perspective view of an alternative embodiment of the collector plate of the oven of FIG. 1.

Referring to FIG. 5, an alternative collector plate 60 of the present invention is shown. Collector plate 60 has a drain screen 62 that is positioned over a drain tube not shown in FIG. 5. Drain screen 62 traps oversize waste particles that might otherwise clog the drain tube, overfill tube 31 and/or other tubing in the drain system.

Collector plate 60 also has a front support 64 and a back support 68. Front support 64 has an opening 66 that allows manual filling of water into reservoir 30 without removal of collector plate 60. Back support 68 is constructed of tubing that affords robust support for collector plate 60. The tubing may be any desired shape, such as the square shape shown in FIG. 5.

Steaming oven 20 of the present invention provides several advantages. Collector plate 32 prevents contaminants from entering reservoir 30, which in turn prevents those materials from contaminating food cooked in later batches with the tastes or residues of previously cooked items. The removal of contaminants from reservoir 30 significantly reduces the potential for generating foam in oven chamber 24. This foam can spill from oven chamber 24 when the door is opened. This can cause slipping hazards and other undesirable effects. Overfill tube 31 also provides a safety overflow drain to prevent oven chamber 24 from flooding in the event of component failure in the automatic water fill system. If oven chamber 24 flooded and an operator opened the door, there would be a potential for serious injury, both from the hot water itself and also from the potential slipping hazard of water on the floor. Collector plates 32 and 60 may be fabricated from any suitable material, such as metal, plastic and the like. Preferably, collector plates 32 and 60 are stainless steel. Also, collector plates 32 and 60 are preferably removable for ease of cleaning. Collector plates 32 and 60 may be designed to be "self-positioning" when installed in the cooking compartment. Removal of the contaminants before they enter water reservoir 30 reduces the amount of reservoir cleaning that is required. Gap 38 between collector plate 32 and the sides of the oven chamber 24 provide space for improved steam circulation, leading to better cooking performance.

The present invention having been thus described with particular reference to the preferred forms thereof, it will be obvious that various changes and modifications may be made therein without departing from the spirit and scope of the present invention as defined in the appended claims.

What is claimed is:

1. A steaming oven comprising:
   an oven chamber;
   a water reservoir disposed in said oven chamber to provide steam therein;
   an overflow device disposed in said water reservoir so as to prevent water from exceeding a predetermined level; and
   a collector plate disposed in said oven chamber above said water reservoir, said collector plate comprising a drain in registry with said overflow device so that waste material collected by said collector plate flows through said overflow device.

2. The steaming oven of claim 1, wherein said drain comprises a drain tube that is inserted into said overflow device.

3. The steaming oven of claim 2, wherein said drain tube has a smaller diameter than an opening of said overflow device.

4. The steaming oven of claim 2, wherein said collector plate further comprises a drain cover in registry with said drain.

5. The steaming oven of claim 1, wherein said collector plate comprises a front support and a back support that are dimensioned and positioned to align said collector plate and said drain with said overflow device when said collector plate is being installed in said oven chamber.

6. The steaming oven of claim 5, wherein said overflow device provides additional support for said collector plate.

7. The steaming oven of claim 5, wherein said front support comprises a water fill opening.

8. The steaming oven of claim 5, wherein said back support comprises a tubular shape.

9. The steaming oven of claim 1, wherein said collector plate is sloped toward said drain.

10. The steaming oven of claim 1, wherein said collector plate is removably disposed in said oven chamber.

11. The steaming oven of claim 1, wherein said collector plate is dimensioned so that a passage is provided along at least two edges thereof for the passage of steam from said reservoir into said oven chamber.

12. The method of claim 11, A method of disposing of waste material in a steaming oven chamber comprising:
    collecting said waste material in a collector plate disposed above a reservoir of water in said oven chamber; and
    conveying said waste material collected by said collector plate from said oven chamber via a conduit, wherein said conduit is at least partially disposed in said water reservoir.

13. The method of claim 12, wherein said waste material is conveyed from said oven chamber without contaminating water in said water reservoir.

14. The method of claim 12, further comprising conveying an overflow of water in said reservoir from said oven chamber via said conduit.

15. The method of claim 12 wherein said conduit is at least partially disposed in a region between said collector plate and said water reservoir.

16. The method of claim 12, wherein an opening of said conduit is above water in said water reservoir.

17. The method of claim 16, wherein said waste material is conveyed to said opening of said conduit.

18. The method of claim 16, wherein said opening is in registry with a drain of said collector plate.

19. The method of claim 12, further comprising an exit hole, and wherein said waste material collected by said collector plate is conveyed from said oven via said exit hole.

20. The method of claim 19, wherein said exit hole is located outside of said water reservoir.

21. A steaming oven comprising:
    an oven chamber;
    a water reservoir disposed in said oven chamber to provide steam therein;
    a collector plate disposed in said oven chamber above said water reservoir; and
    a conduit positioned to convey waste material collected by said collector plate from said oven chamber, wherein said conduit is at least partially disposed in said water reservoir.

22. The steaming oven of claim 21, wherein said conduit conveys said waste material from said oven chamber without contaminating water in said water reservoir.

23. The steaming oven of claim 21, wherein said conduit is positioned to also convey an overflow of water from said water reservoir.

24. The steaming oven of claim 21, wherein said conduit is at least partially disposed in a region between said collector plate and said water reservoir.

25. The steaming oven of claim 21, wherein an opening of said conduit is above water in said water reservoir.

26. The steaming oven of claim 25, wherein said waste material is conveyed to said opening of said conduit.

27. The steaming oven of claim 25, wherein said opening is in registry with a drain of said collector plate.

28. The steaming oven of claim 21, further comprising a drain situated in said collector plate, and wherein said drain is in registry with said conduit.

29. The steaming oven of claim 28, further comprising an exit hole, and wherein said waste material is conveyed from said oven via said drain, said conduit and said exit hole.

* * * * *

UNITED STATES PATENT AND TRADEMARK OFFICE
CERTIFICATE OF CORRECTION

PATENT NO. : 6,833,534 B2
DATED : December 21, 2004
INVENTOR(S) : Bellassai et al.

It is certified that error appears in the above-identified patent and that said Letters Patent is hereby corrected as shown below:

Column 5,
Line 26, please delete "The method of claim 11".

Signed and Sealed this

Fourth Day of October, 2005

JON W. DUDAS
*Director of the United States Patent and Trademark Office*